(12) United States Patent
Musbah et al.

(10) Patent No.: US 11,724,186 B2
(45) Date of Patent: Aug. 15, 2023

(54) PROVIDING AUTOMATED USER INPUT TO AN APPLICATION

(71) Applicant: Microsoft Technology Licensing, LLC, Redmond, WA (US)

(72) Inventors: Mohamed Musbah, Montreal (CA); Matthew Mitchell Dixon, Westmount (CA); Geoffrey Jacoby Gordon, Montreal (CA); Mahmoud Adada, Montreal (CA); Soroush Mehri, Montreal (CA); Andrew James McNamara, Cambridge (CA); Jonathan David Morrison, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/537,951

(22) Filed: Nov. 30, 2021

(65) Prior Publication Data

US 2022/0168635 A1   Jun. 2, 2022

Related U.S. Application Data

(63) Continuation of application No. 16/660,584, filed on Oct. 22, 2019, now Pat. No. 11,213,746.

(51) Int. Cl.
*A63F 13/422* (2014.01)
*A63F 13/358* (2014.01)
*G06N 20/00* (2019.01)

(52) U.S. Cl.
CPC .......... *A63F 13/422* (2014.09); *A63F 13/358* (2014.09); *G06N 20/00* (2019.01); *A63F 2300/534* (2013.01); *A63F 2300/535* (2013.01)

(58) Field of Classification Search
CPC ...... A63F 13/42; A63F 13/422; A63F 13/358; A63F 2300/534; A63F 2300/535; G06N 20/00
See application file for complete search history.

(56) References Cited

U.S. PATENT DOCUMENTS

| | | | | |
|---|---|---|---|---|
| 5,830,067 A | * | 11/1998 | Graves | G07F 17/32 463/19 |
| 6,024,643 A | * | 2/2000 | Begis | A63F 13/12 463/1 |
| 6,244,957 B1 | * | 6/2001 | Walker | G07F 17/32 463/20 |
| 6,485,367 B1 | * | 11/2002 | Joshi | G07F 17/3293 463/20 |

(Continued)

OTHER PUBLICATIONS

"Non Final Office Action Issued in U.S. Appl. No. 17/677,516", dated Jan. 10, 2023, 11 Pages.

*Primary Examiner* — Steve Rowland
(74) *Attorney, Agent, or Firm* — Rainier Patents, P.S.

(57) ABSTRACT

This document relates to techniques for addressing disruptions that prevent applications from receiving user input, prevent users from providing input to an application, and/or prevents or impacts users from receiving application output. One example method involves detecting a disruption to an interactive application during interaction by a user with the interactive application, generating automated user inputs, and providing the automated user inputs to the interactive application during the disruption to the interactive application.

20 Claims, 11 Drawing Sheets

(56) References Cited

U.S. PATENT DOCUMENTS

| | | | | |
|---|---|---|---|---|
| 10,265,017 B1* | 4/2019 | Myslinski | ............... | A61B 5/07 |
| 10,286,322 B1* | 5/2019 | Wakeford | ............... | A63F 13/57 |
| 10,394,414 B1* | 8/2019 | Wakeford | ............... | A63F 13/67 |
| 2006/0154710 A1* | 7/2006 | Serafat | ................. | A63F 13/48 |
| | | | | 463/29 |
| 2006/0246972 A1* | 11/2006 | Thomas | ................. | A63F 13/67 |
| | | | | 463/4 |
| 2006/0287075 A1* | 12/2006 | Walker | ............... | G07F 17/3269 |
| | | | | 463/25 |
| 2007/0298886 A1* | 12/2007 | Aguilar, Jr. | ............. | G07F 17/32 |
| | | | | 463/42 |
| 2008/0318656 A1* | 12/2008 | Walker | ............... | G07F 17/3262 |
| | | | | 463/20 |
| 2012/0015746 A1* | 1/2012 | Mooney | ............... | A63F 13/795 |
| | | | | 463/42 |
| 2013/0035164 A1* | 2/2013 | Osvald | ................. | A63F 13/795 |
| | | | | 463/42 |
| 2014/0018143 A1* | 1/2014 | Yarbrough | .......... | G07F 17/3262 |
| | | | | 463/19 |
| 2018/0001205 A1* | 1/2018 | Osman | ................... | A63F 13/67 |
| 2018/0001206 A1* | 1/2018 | Osman | ............... | A63F 13/5375 |
| 2018/0256981 A1* | 9/2018 | Enomoto | ............. | A63F 13/67 |
| 2019/0321727 A1* | 10/2019 | Rodgers | ................. | A63F 13/50 |
| 2020/0016363 A1* | 1/2020 | Macri | ................... | G06F 3/015 |
| 2020/0383074 A1 | 12/2020 | Kloor | | |

* cited by examiner

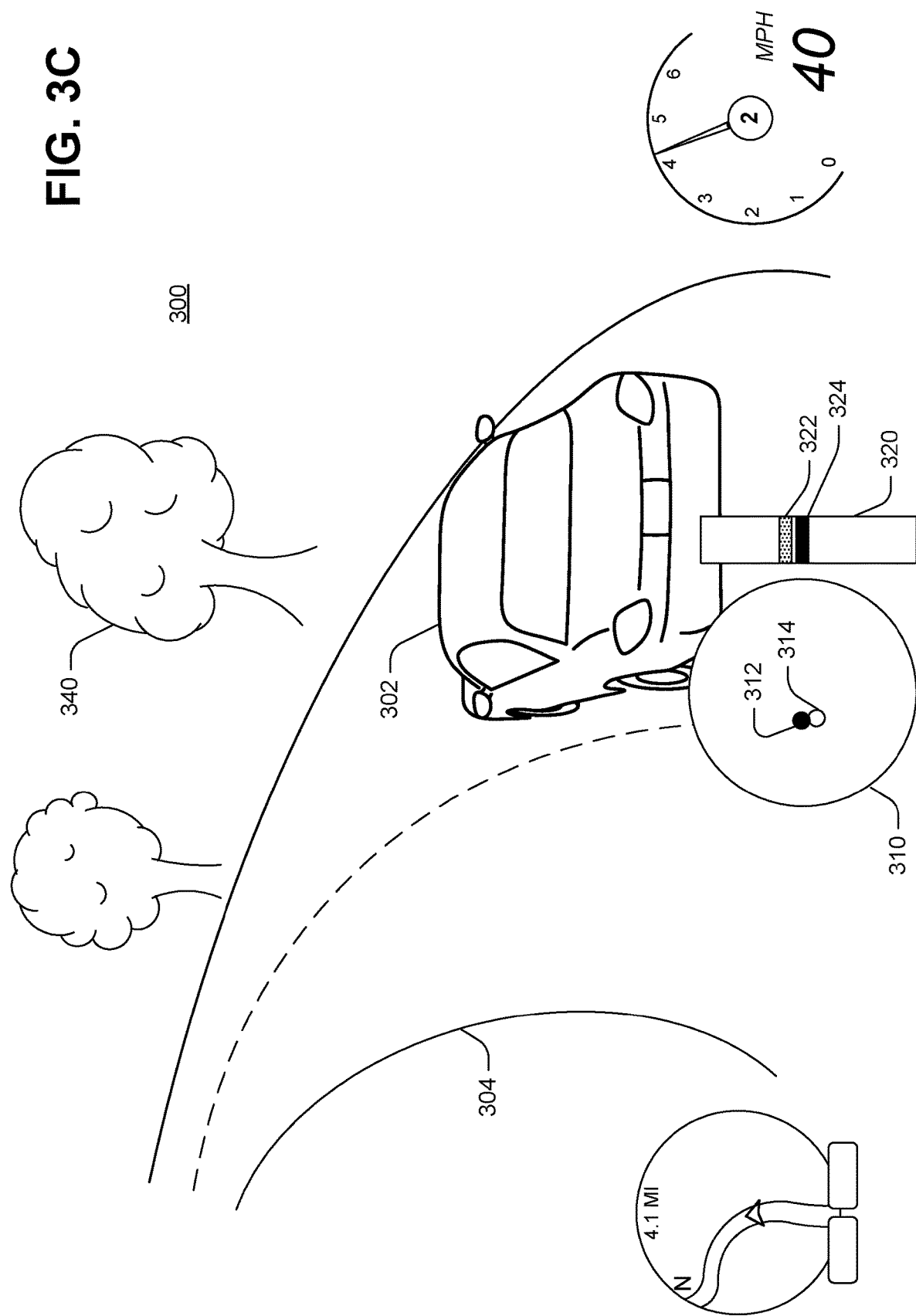

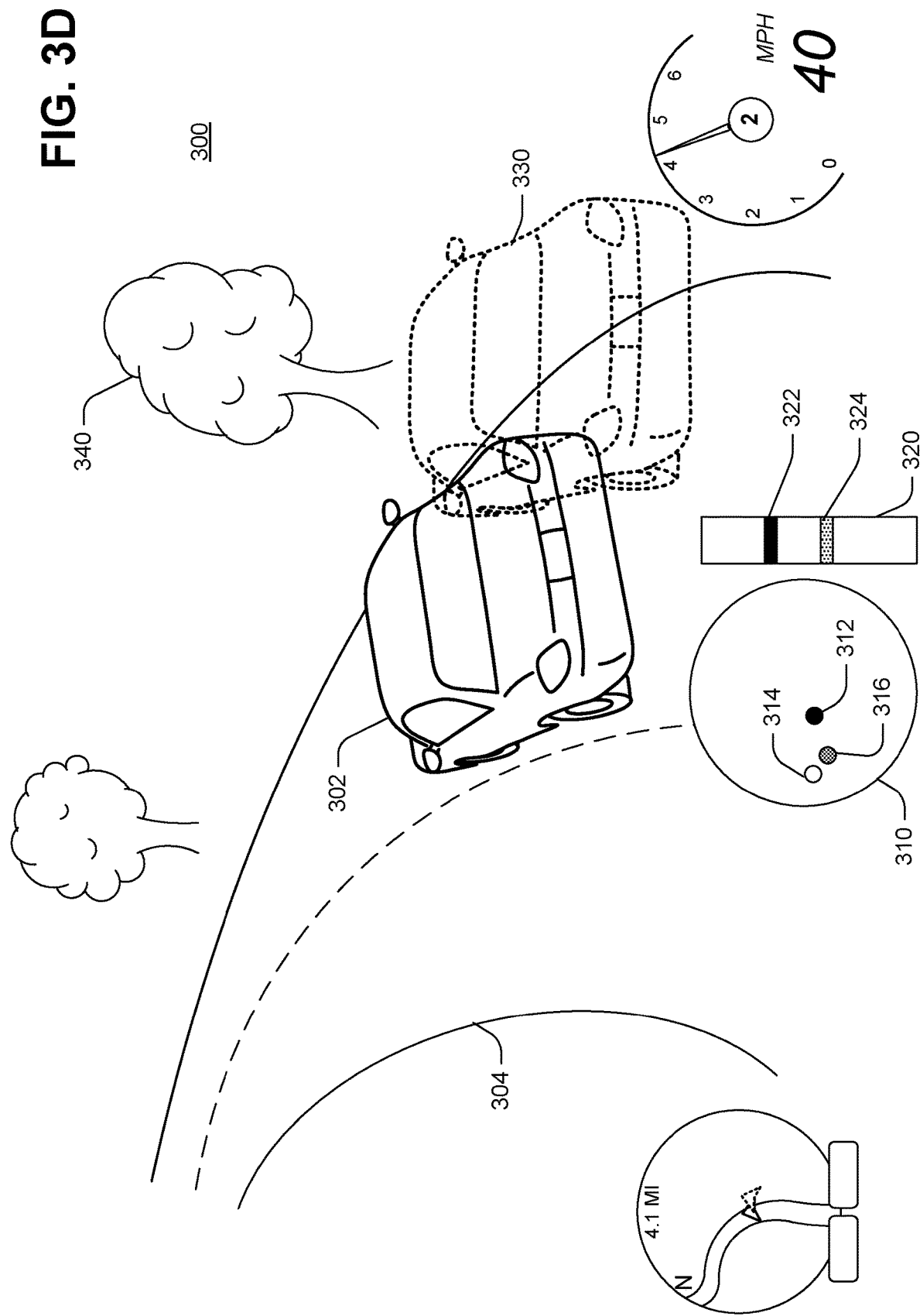

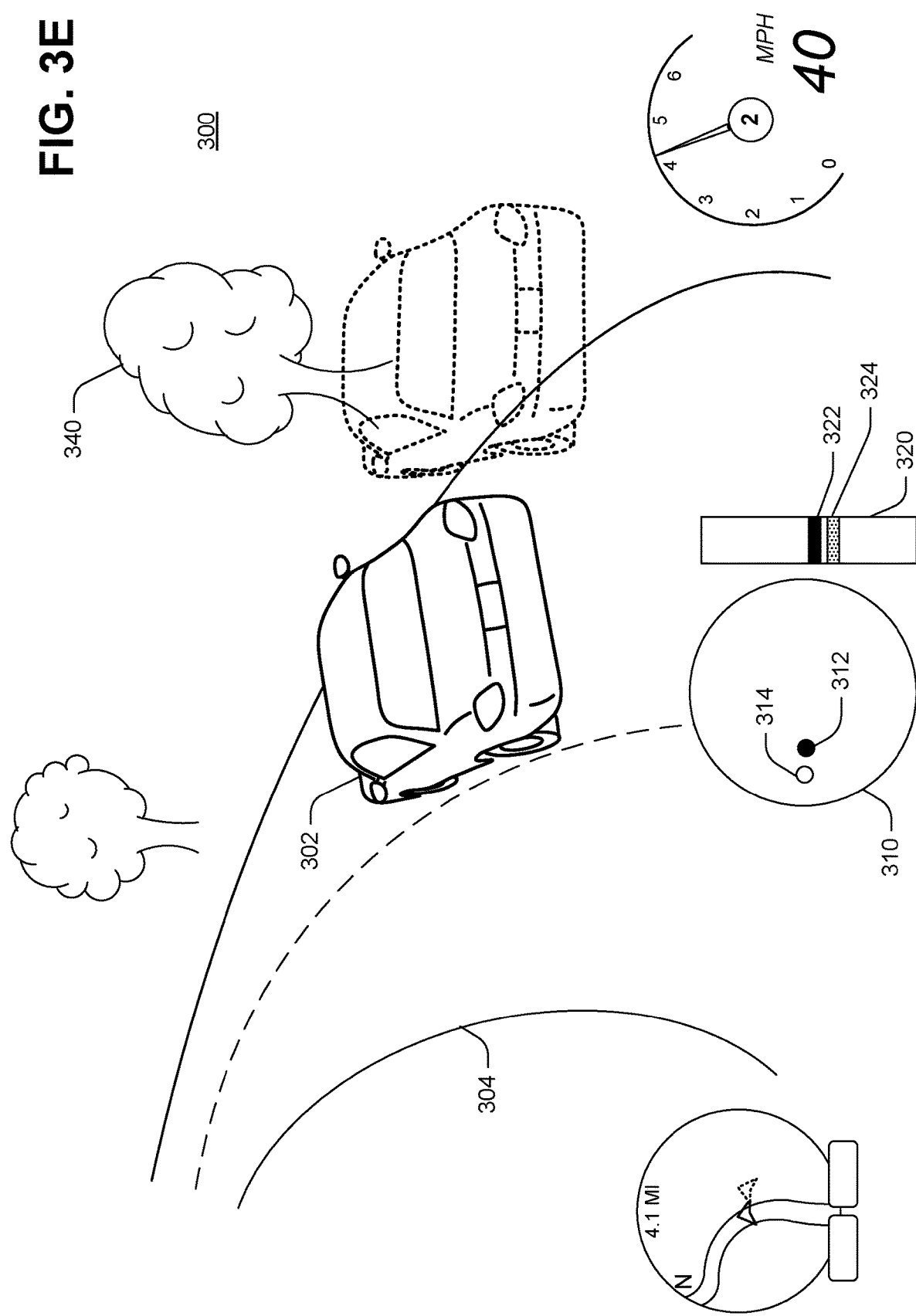

PROVIDING AUTOMATED USER INPUT TO AN APPLICATION

BACKGROUND

In many computing environments, disruptions are problematic. For instance, when a user is playing a video game or using another type of interactive application over a network, network disruptions can cause the interactive application to be non-responsive to the user's inputs. Disruptions can also be non-technical in nature, such as when a user is interrupted by a family member or friend. Automated efforts to address such disruptions have met with limited success.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for addressing disruptions that prevent applications from receiving user input, prevent users from providing input, and/or prevent users from receiving application output. One example includes a method or technique that can be performed on a computing device. The method or technique can include detecting a disruption to an interactive application during interaction by a user with the interactive application. The method or technique can also include generating automated user inputs and providing the automated user inputs to the interactive application responsive to detecting the disruption.

Another example includes a system having a hardware processing unit and a storage resource storing computer-readable instructions. When executed by the hardware processing unit, the computer-readable instructions can cause the hardware processing unit to detect a network disruption that at least temporarily prevents a streaming interactive application from receiving one or more actual user inputs. The computer-readable instructions can also cause the hardware processing unit to generate automated user inputs using previously received actual user inputs. The computer-readable instructions can also cause the hardware processing unit to substitute the automated user inputs for the one or more actual user inputs to the streaming interactive application responsive to detecting the network disruption.

Another example includes a computer-readable storage medium storing computer-readable instructions which, when executed by a hardware processing unit, cause the hardware processing unit to perform acts. The acts can include receiving video output of an interactive application and receiving actual user inputs to the interactive application provided by a user. The acts can also include detecting a disruption that prevents the interactive application from receiving further actual user inputs. The acts can also include providing the video output of the interactive application and the actual user inputs to a prediction model and obtaining predicted user inputs from the prediction model. The acts can also include providing the predicted user inputs to the interactive application during the disruption.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 3A-3E illustrate an example user experience, consistent with some implementations of the present concepts.

DETAILED DESCRIPTION

Overview

Figure 1:
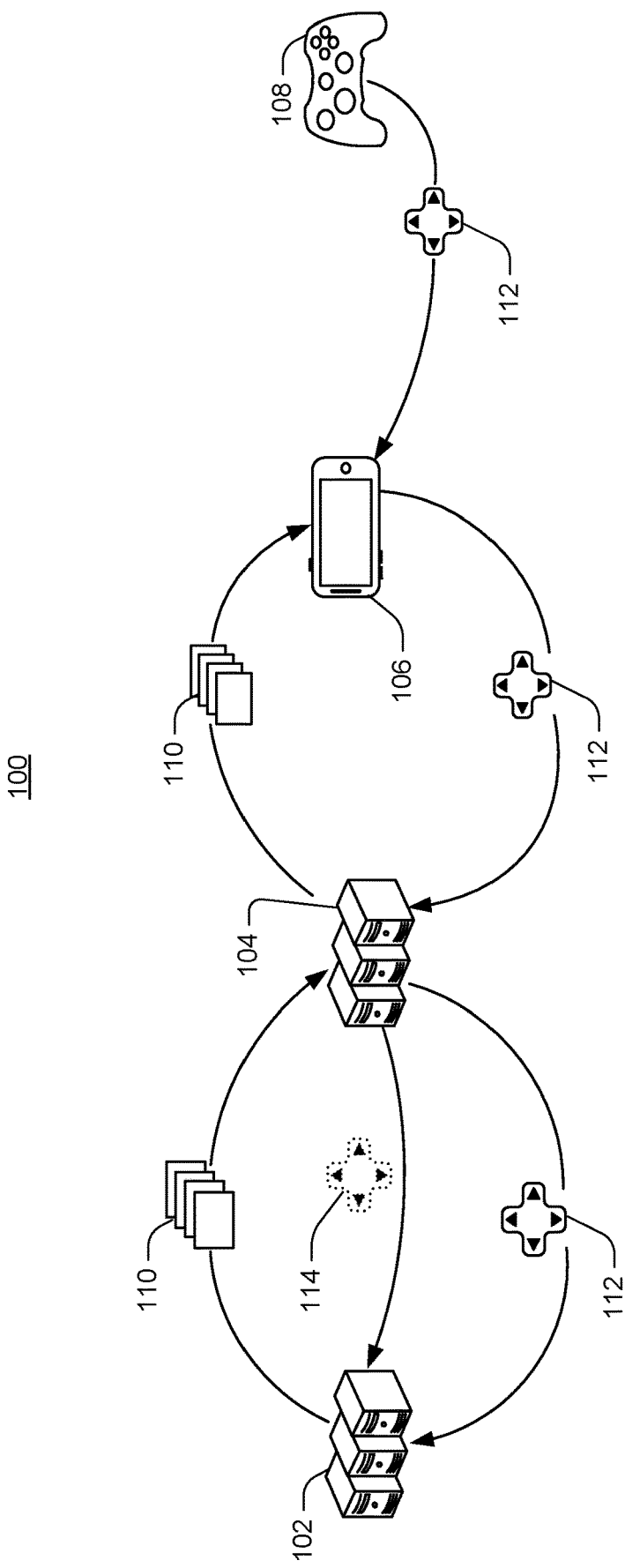
FIG. 1 illustrates an example gaming environment, consistent with some implementations of the present concepts.

As noted, disruptions can be problematic for users of interactive applications, such as video games, augmented reality applications, or other applications where the users frequently provide input to control the application. For online applications, network disruptions between a user device and an application server can cause the application server to receive inputs too late to effectively use them to control the online application. In addition, network disruptions can cause the user device to receive outputs of the application server, such as video or audio outputs, too late for the user to effectively respond. In either case, the application experience suffers.

One rudimentary approach for addressing application disruptions is to continue using the most recent input that was received before the disruption began for the duration of the disruption. However, this approach can negatively impact the application experience for the user. For instance, the most-recent inputs may cause negative or unanticipated consequences in the application because the user did not have an opportunity to adjust their inputs to respond to application output generated during the disruption period.

A more sophisticated alternative could involve monitoring internal application state and adjusting the internal application state during disruptions to provide a more fluid user experience. However, this approach can involve extensive development efforts such as modifying internal application code to handle disruptions and/or to providing hooks to internal application state to external disruption-handling software.

The disclosed implementations offer approaches for mitigation of application disruptions that address the above issues. In the disclosed implementations, automated user inputs are substituted for actual user inputs during an application disruption. When the disruption ends, control can be returned to the user.

In some implementations, the automated user inputs can be generated without accessing internal application state. For example, a user interaction model can generate the automated user inputs using information such as application outputs and previously received user inputs, and the automated user inputs generated by the user interaction model can be provided to the application during the disruption. As a consequence, the disclosed implementations can provide users with a seamless experience during disruptions without necessitating modifications to application code.

In addition, the disclosed implementations can provide a realistic user experience by utilizing automated user inputs that accurately reflect how a particular user would have interacted with a given application in the absence of a disruption. In comparison, approaches that attempt to emulate optimal behavior rather than predicted user behavior may lead to unrealistic results, as discussed more below.

Terminology

For the purposes of this document, the term "application" refers to any type of executable software, firmware, or hardware logic to perform a specified function. The term "interactive application" refers to an application that performs processing responsive to received user input and iteratively, frequently, or continually adjusts application output in response to the received user input. The term "online application" refers to an application that is accessible over any type of computer network or communication link, either by streaming or downloading the application from one device to another. The term "streaming application" refers to an online application that executes on a first device and sends a stream of application output to one or more other devices over a network or other communication link. The other device or devices can reproduce the application output, e.g., using a display or audio device, and can also provide user input to the streaming application.

The term "disruption" refers to any situation that at least temporarily impacts or prevents user interaction with an interactive application. For instance, disruptions can be technical in nature, e.g., network disruptions or other technical issues that prevent the interactive application from receiving actual user input and/or prevent the user from receiving application output. Common disruptions can include network conditions, such as latency, bandwidth limits, or packet drops. Disruptions can also be non-technical in nature, e.g., a user may be distracted due to a conversation with a friend or family member, an incoming phone call, etc.

The term "user interaction model" refers to any type of machine learning, heuristic, or rules-based approach that can be used to model user interactions with an application, e.g., by generating automated user inputs. The term "actual user input" refers to input actually provided by a user during a course of interaction with an interactive application. The term "automated user input" refers to machine-generated representations that can be substituted for actual user input during a disruption. In some cases, automated user inputs output by a given model can be used without modification, and in other cases, automated user inputs output by a model can be smoothed or otherwise combined with previously-received actual user inputs before being provided to an interactive application. Thus, the term "automated user input" encompasses both the unmodified output of a user interaction model as well as output of a user interaction model that has been smoothed or otherwise combined with actual user input.

The term "machine learning model" refers to any of a broad range of models that can learn to generate automated user input by observing properties of past interactions between users and applications. For instance, a machine learning model could be a neural network, a support vector machine, a decision tree, a clustering algorithm, etc. In some cases, a machine learning model can be trained using labeled training data, a reward function, or other mechanisms, and in other cases, a machine learning model can learn by analyzing data without explicit labels or rewards. The term "user-specific model" refers to a model that has at least one component that has been trained or constructed at least partially for a specific user. Thus, this term encompasses models that have been trained entirely for a specific user, models that are initialized using multi-user data and tuned to the specific user, and models that have both generic components trained for multiple users and one or more components trained or tuned for the specific user. Likewise, the term "application-specific model" refers to a model that has at least one component that has been trained or constructed at least partially for a specific application.

The term "neural network" refers to a type of machine learning model that uses layers of nodes to perform specific operations. In a neural network, nodes are connected to one another via one or more edges. A neural network can include an input layer, an output layer, and one or more intermediate layers. Individual nodes can process their respective inputs according to a predefined function (e.g., a transfer function such as ReLU or sigmoid), and provide an output of the function to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes.

Example Video Game System

The following describes some specific examples of how the present concepts can be employed in the context of a streaming video game where network disruptions can impact gameplay. However, as discussed elsewhere herein, the present concepts are not limited to video games, are not limited to streaming or networked applications, and are not limited to addressing network disruptions. Rather, the present concepts can be employed in a wide range of technical environments to address many different types of disruptions for various types of interactive applications.

FIG. 1 illustrates an exemplary gaming environment 100, consistent with the disclosed implementations. For instance, FIG. 1 illustrates exemplary communications among an application server 102, an intermediary server 104, a client device 106, and a video game controller 108. The application server can execute an interactive application such as a streaming video game and generate outputs 110, which can include video, audio, and/or haptic outputs. The application server can send the outputs to the intermediary server, which can forward the outputs to the client device 106.

The client device 106 can display video output on a display and play back audio output via a speaker. In instances where the video game provides haptic output, the client device can forward the haptic output to the video game controller 108 (not shown in FIG. 1). The video game controller can generate haptic feedback based on the haptic output received from the application server. In addition, the video game controller can generate actual user input 112 based on user interaction with various input mechanisms of the video game controller. The video game controller can send the actual user input to the client device, which can forward the actual user input back to the intermediary server 104.

In the absence of disruptions, the intermediary server 104 can simply act as a passthrough server and forward the actual user input 112 to the game server. However, when a network disruption is detected, the intermediary server can instead provide automated user input 114 to the application server. As described more below, the automated user input can enable the application server to continue application processing in a manner that can reduce or eliminate user perception of the disruption, so that the user is seamlessly reintroduced into the application experience once the disruption ends.

Example Timeline

Figure 2:
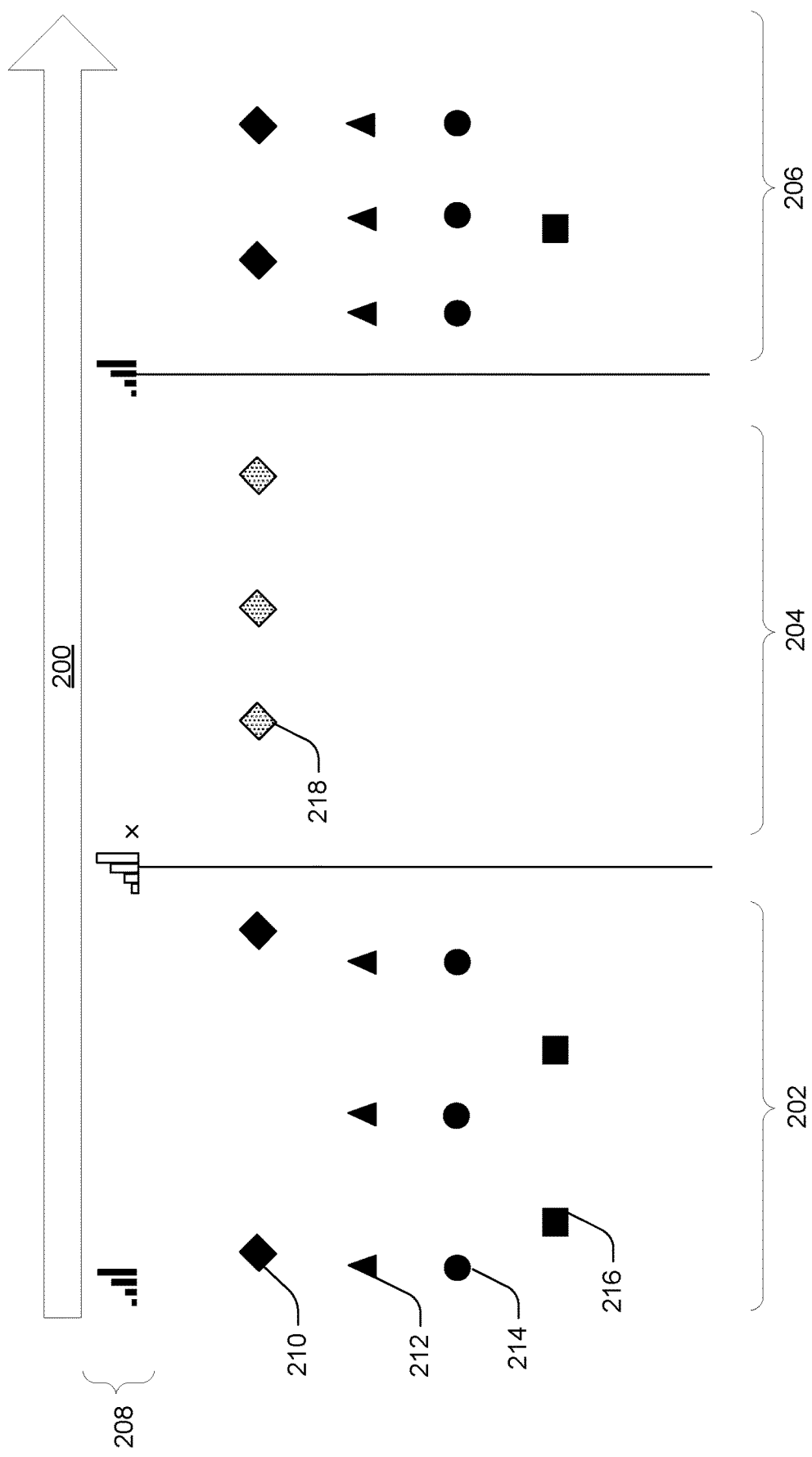
FIG. 2 illustrates an example timeline, consistent with some implementations of the present concepts.

FIG. 2 illustrates an example timeline 200. Timeline 200 encompasses three time periods, a time period 202 occurring prior to a network disruption, a time period 204 during which there is a network disruption, and a time period 206 occurring after the network disruption. Timeline 200 illustrates how the disclosed implementations can be used to address the network disruption, which is indicated in FIG. 2 via network state representations 208.

In time period 202, actual user inputs 210 are utilized to control the video game. The video game can produce video outputs 212, audio outputs 214, and/or haptic outputs 216 in response to the actual controller inputs and/or internal game state. Note that these outputs are not necessarily provided at a fixed rate, although video and audio in particular can be provided at a specified frame rate in some implementations. In many cases, haptic outputs and user inputs in particular are asynchronous.

In time period 204, the network is disrupted. For the purposes of example, assume that the disruption impacts traffic flow both to and from the user and thus the user's device receives no video game outputs and the application server receives no actual user input. During the disruption, automated user inputs 218 are provided to substitute for the actual user inputs that are unavailable due to the network disruption. As discussed more below, in some implementations the automated user inputs can be generated by a user interaction model that has access to video game outputs during the network disruption. For example, the user interaction model can have local network access to the application server and the network disruption can occur on an external network, or the user interaction model can execute on the same device as the video game.

In time period 206, the network recovers and further actual user input is received and provided to the game. As discussed more below, this allows the video game to seamlessly transition from the network disruption back to user control in a manner that may not be disruptive to the user. As discussed elsewhere herein, some implementations may smooth or otherwise combine automated user input with actual user input to further reduce the impact of network disruptions on the user input.

Example User Experience

Figure 3A:
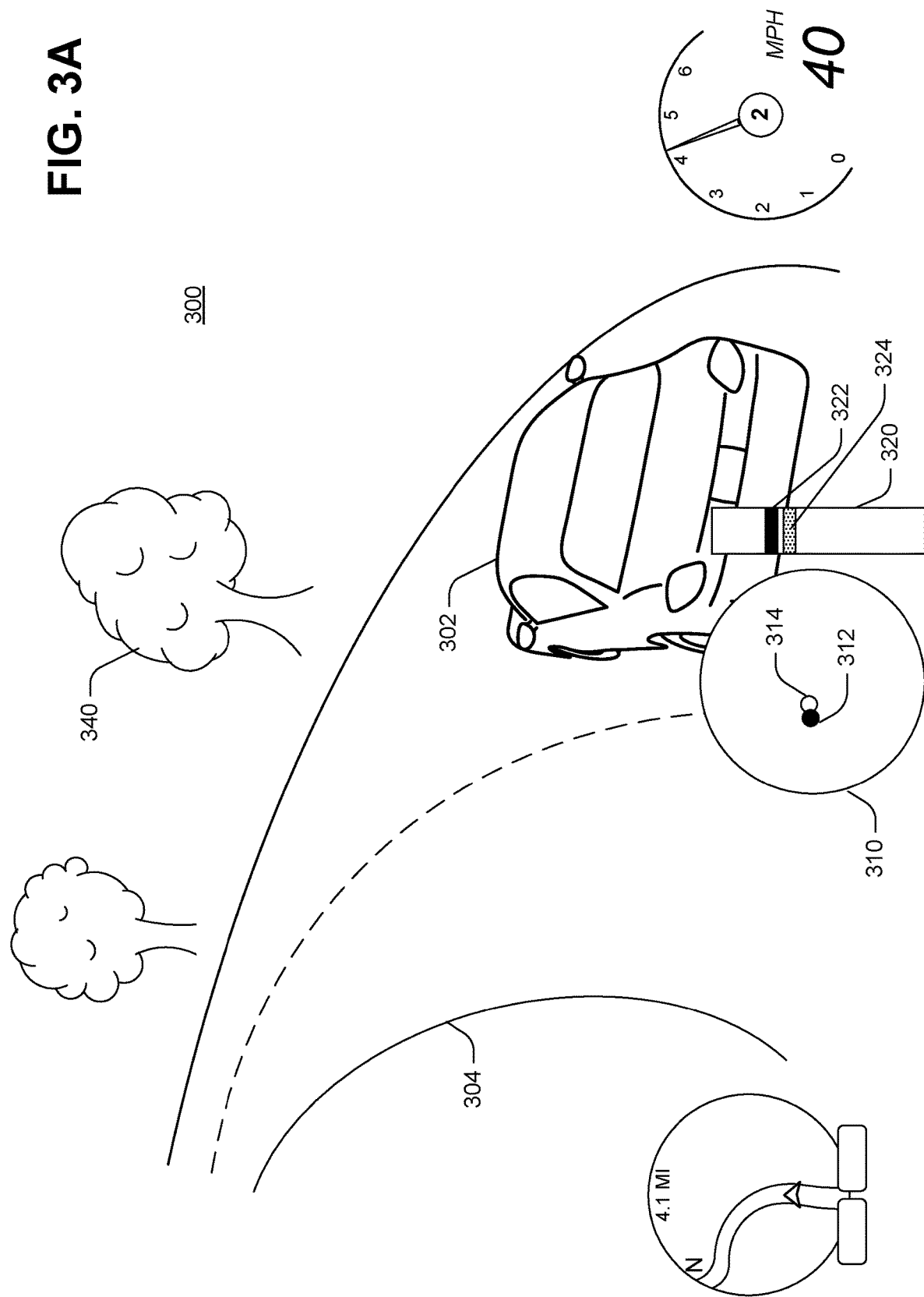

FIGS. 3A-3E illustrate an exemplary user experience 300 of a user playing a driving video game. In FIG. 3A, car 302 is shown moving along a road 304. FIG. 3A also shows a directional representation 310 and a trigger representation 320, which represent controller inputs to the driving game. Generally, the directional representation conveys directional magnitudes for a directional input mechanism on a video game controller, e.g., a thumb stick for steering the car. Likewise, the trigger representation 320 conveys the magnitude of a trigger input on the video game controller, e.g., for controlling the car's throttle. Thumb sticks and triggers are two examples of "analog" input mechanisms that can be provided on a controller. The term "analog" is used to refer to input mechanisms that are not merely on/off. For instance, by varying the magnitude of the input to an analog input mechanism, the user can cause the analog input mechanism to produce a signal that can be represented digitally using a range of values greater than two.

Directional representation 310 is shown with an actual received directional input 312, shown in black, and automated directional input 314, shown in white. Likewise, trigger representation 320 shows an actual received trigger input 322 in black and an automated trigger input 324 in white. For the purposes of the following, assume that the automated inputs are being generated by a user interaction model in the background as the user plays the driving game.

In FIG. 3A, the car is being controlled via the actual directional input 312 and the actual trigger input 322, as the user is gently steering the car 302 to the left with moderate throttle. The automated directional input 314 and the automated trigger input 324 produced by the user interaction model are similar to the actual user inputs, but are not presently being used to control the car.

Figure 3B:
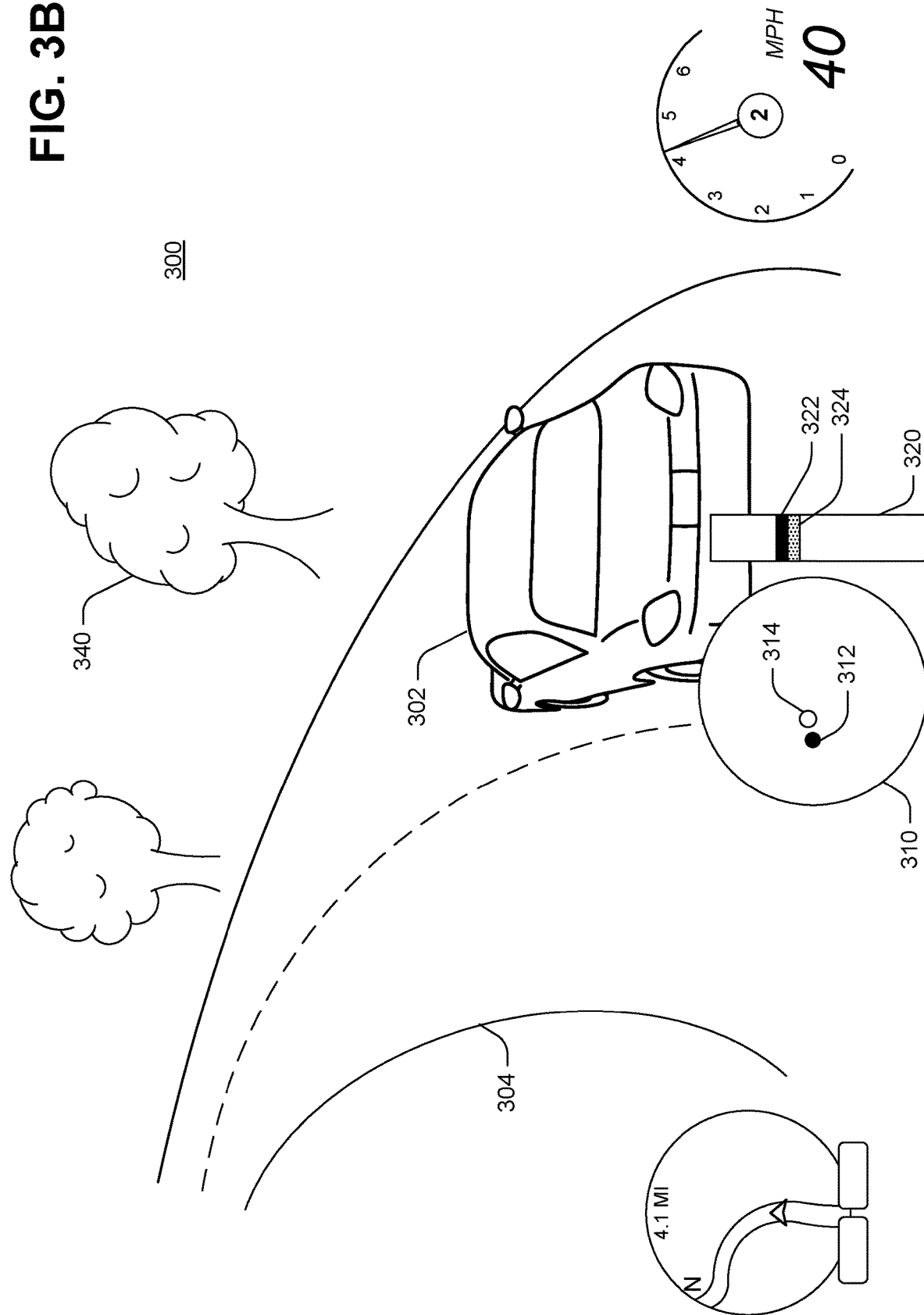

In FIGS. 3B and 3C, car 302 continues down the road 304 and the actual and automated user inputs vary somewhat as the user continues to gently navigate the car to the left. The car continues to be controlled by the actual user inputs, as no disruption has yet occurred.

In FIG. 3D, a disruption occurs. Assume for the purposes of example that the disruption prevents the video game from receiving actual user inputs but that video output to the user is unimpeded. The user needs to turn the car 302 sharply to the left and reduce the throttle to correctly navigate the turn in the road 304. However, the most recent actual user inputs are stale, e.g., even if the user has adjusted their thumb stick and trigger inputs to sharpen the turn and reduce the throttle, those actual user inputs have not been received by the video game. As a consequence, if the stale user inputs are used, the car will drift off the road as shown by ghost car 330, as the leftward magnitude of the stale directional input is too small to correctly navigate the turn.

At this time, the automated user input can be substituted for the actual user input. For instance, in FIG. 3D, the automated directional input 314 is used instead of the stale most recently-received user input, and the automated directional input sharply turns the car to the left while the automated trigger input 324 reduces the throttle to slow the car 302. Thus, because the car is controlled by the automated user inputs during the disruption, the car continues down the road 304 without drifting off of the road. FIG. 3D also shows the current actual user input 316 (hatch pattern), which is impacted by the disruption and thus not available for controlling gameplay.

FIG. 3E shows the video game after recovering from the disruption. Because the automated user inputs were used during the disruption to control the car 302, the car is approximately where the user expects the car to be on the road 304 when control is returned to the user. The actual received directional input 312 received from the user has moved to the left to show that the user has correctly sharpened the turn to the left. Likewise, the actual received trigger input 322 received from the user has decreased the throttle.

Because the automated user inputs that were used during the disruption are similar to the actual inputs provided by the user during the disruption, the user does not perceive a significant impact to the game play experience. In contrast, had the most recently-received stale user inputs been used instead of the automated inputs, the user might have experienced a crash, as shown by ghost car 330 colliding with tree 340.

Example Model Processing Flow

Figure 4:
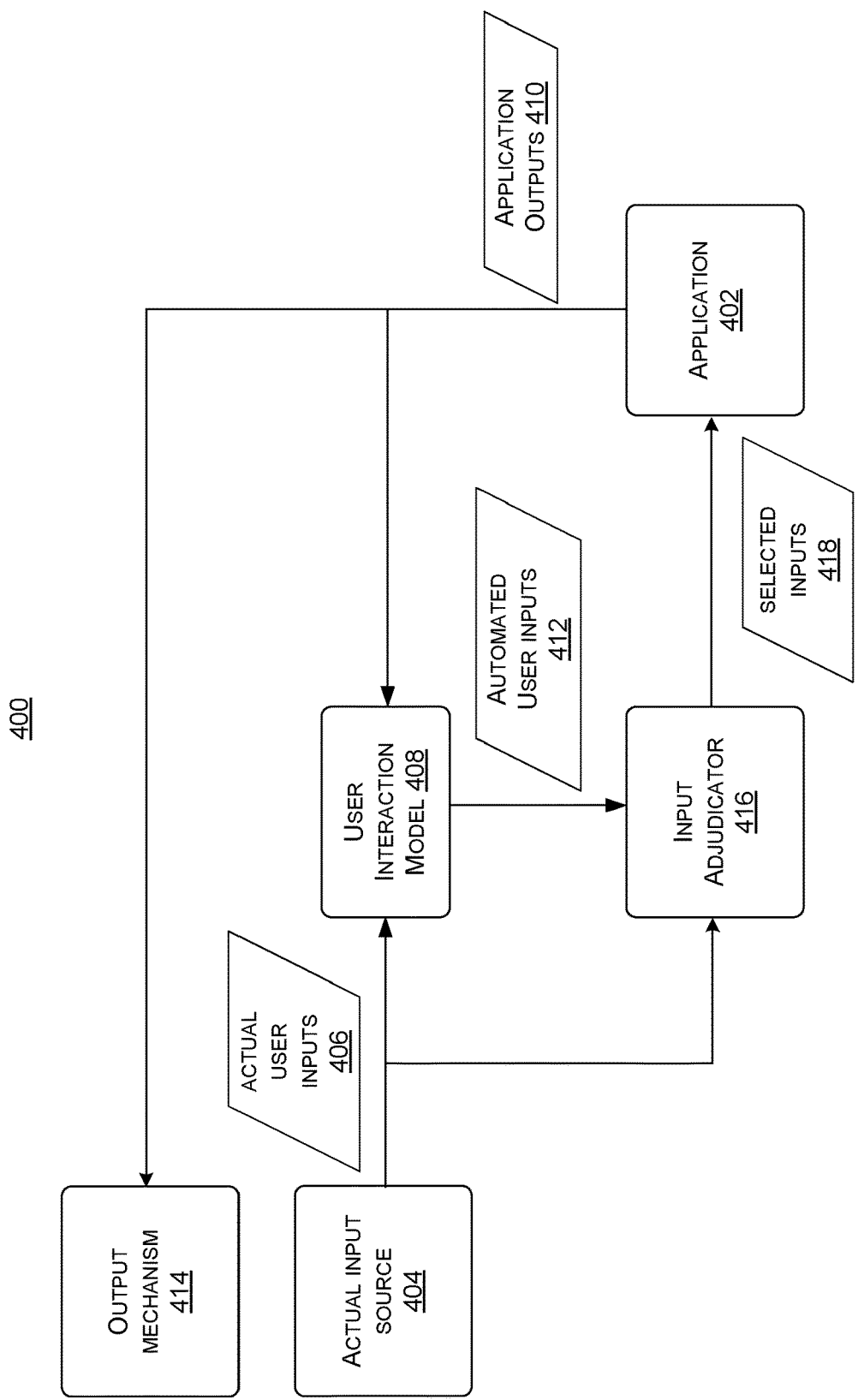
FIG. 4 illustrates an example processing flow, consistent with some implementations of the present concepts.

FIG. 4 illustrates an example processing flow 400 that can be employed to selectively provide actual or automated input to an application 402. In processing flow 400, an actual input source 404 provides actual user inputs 406 to a user interaction model 408. The user interaction model 408 can use the actual user inputs and/or application outputs 410 to generate automated user inputs 412. The application outputs can also be provided to an output mechanism 414 for displaying images or video, playing back audio, producing haptic feedback, etc.

Input adjudicator 416 can select either the actual user inputs 406 or the automated user inputs 412 to provide to the application 402 as selected inputs 418. For instance, in the absence of a disruption, the input adjudicator can provide the actual user inputs to the application as the selected inputs. In the event of a disruption, the input adjudicator can substitute the automated user inputs directly for the actual user inputs, e.g., by outputting the automated user inputs as the selected inputs that are provided to the application. In other cases, the input adjudicator can smooth or otherwise combine the automated user inputs provided by the user interaction model with previously-received actual user inputs and output the smoothed/combined automated user inputs to the application.

As discussed more below, processing flow 400 can be employed in a wide range of technical environments. For instance, in some implementations, each part of the processing flow is performed on a single device. In other cases, different parts of the processing flow are performed on different devices. FIG. 1 illustrates a specific example where, for instance, the application 402 could be on the application server 102, the actual input source 404 could be the video game controller 108, the output mechanism 414 could be provided by the client device 106, and the user interaction model 408 and input adjudicator 416 could be provided by the intermediary server 104.

Also, note that processing flow 400 does not necessarily rely on access to internal application state to determine automated user inputs. As suggested previously, this can be useful because it allows the disclosed concepts to be implemented without modifying application code. However, in other cases, a user interaction model may have access to internal application state and use the internal application state to determine automated user inputs. Generally, any internal game state, from raw data on CPU or GPU memory to specific data structures or intermediate graphics pipeline stages can be employed to determine automated user inputs. For instance, a driving video game may provide a number of different simulated driving courses, and the user interaction model may have access to an identifier of the current driving course. As another example, a driving video game may provide a number of different vehicle models for the user to drive, and the user interaction model may have access to an identifier of the currently-selected vehicle model. In implementations where the user interaction model does not have access to internal game state, the user interaction model may be able to infer the current driving course or vehicle model from application output, e.g., by analyzing video output by the application.

Specific Example User Interaction Model

Figure 5:
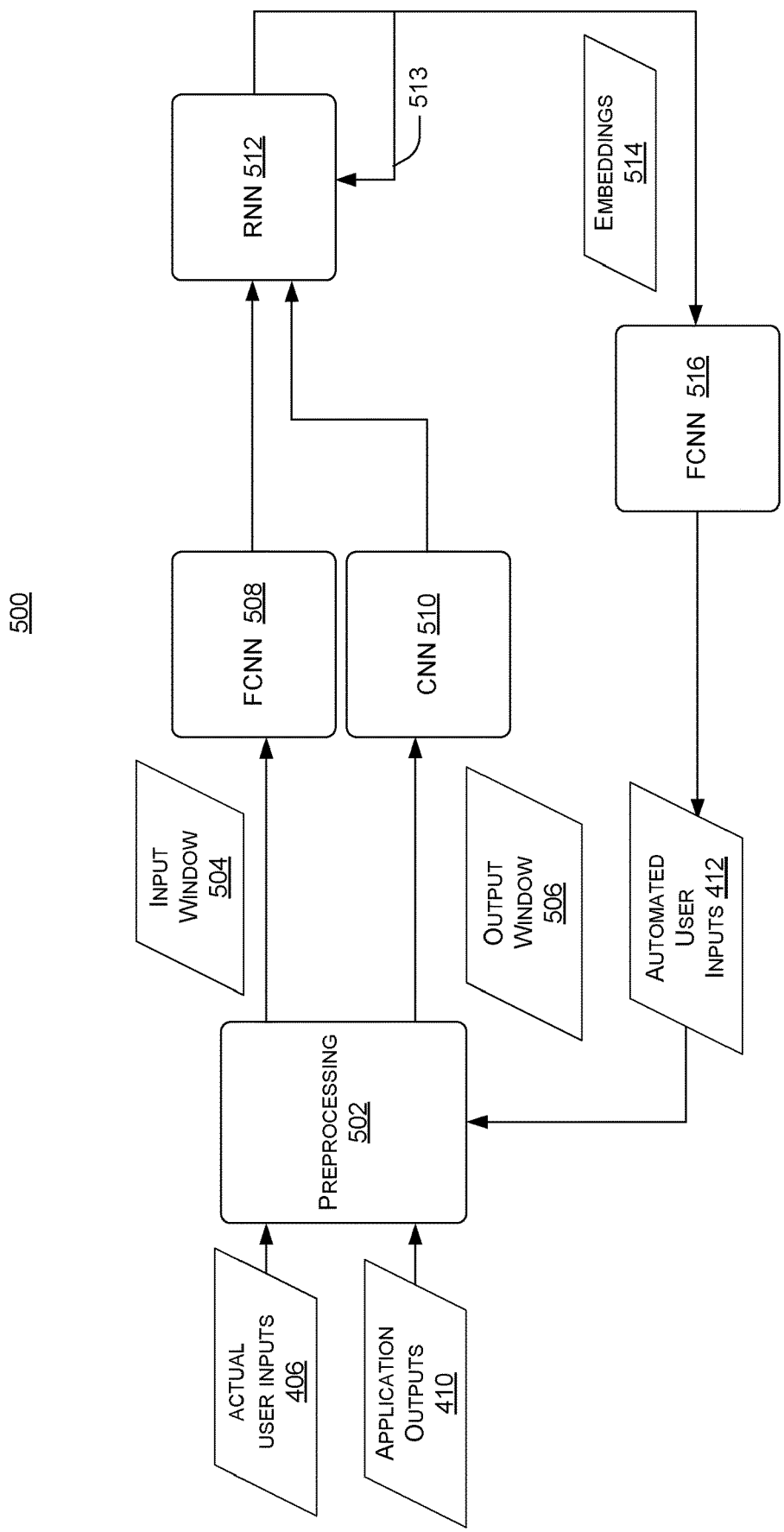
FIG. 5 illustrates an example user interaction model, consistent with some implementations of the present concepts.

As mentioned above, one way to implement the user interaction model 408 is to employ a machine learning approach. FIG. 5 illustrates a neural network-based prediction model 500 that can be employed as a user interaction model, consistent with the present concepts. The following describes one specific implementation of how a neural network-based prediction model can be employed to predict user inputs to an interactive application. In the following description, reference numbers beginning with a "4" refer to elements previously introduced in FIG. 4, and reference numbers beginning with a "5" refer to elements newly-introduced in FIG. 5.

Actual user inputs 406 and application outputs 410 can be input for preprocessing 502. For example, when the actual user inputs are provided via a video game controller having buttons and analog input mechanisms, the controller inputs can be preprocessed by representing buttons as Boolean values and normalizing values of analog inputs to a range of values between −1 and 1. Video or audio outputs can be preprocessed by lowering the resolution of the video and/or audio output, and haptic outputs can be normalized as well, e.g., to a range between −1 and 1.

In some implementations, the preprocessing 502 maintains respective windows of user input and application output. For instance, the following example assumes a one second time window. The preprocessing can include performing time alignment of the actual user input to corresponding frames of video and/or audio data. In addition, haptic output can be time-aligned to the actual user input. This process results in input window 504 and output window 506.

Input window 504 can be input to a fully-connected neural network 508, and output window 506 can be input to a convolutional neural network 510. The outputs of the fully connected neural network (e.g., a vector-space representation of features extracted from the input window) and the convolutional neural network (e.g., a vector-space representation of features extracted from the output window) can be input to a recurrent neural network 512, such as a long-term short-term memory ("LSTM") network.

The recurrent neural network 512 can output embeddings 514, which can represent the user inputs and the application outputs in a vector space. The embeddings can be fed back into the recurrent neural network (as shown by arrow 513) as well as input to another fully connected network 516. Note that some implementations may employ multiple recurrent neural networks, e.g., a first recurrent neural network for processing the output of fully-connected network 508 and a second recurrent neural network for processing the output of convolutional neural network 510.

The fully-connected network 516 can map from the embeddings output by the recurrent neural network(s) to automated user inputs 412. The embeddings represent information about user inputs and application outputs that is used by the fully-connected network 512 to determine automated user inputs 412 (e.g., predicted future user inputs).

In addition, automated user inputs 412 can also be input to preprocessing 502 and preprocessed as described above. Thus, for any given time step, the input that is preprocessed is the input that is selected for that time step, e.g., by input adjudicator 416. As a consequence, at any given time, input window 504 can include all actual user inputs, all automated user inputs (e.g., assuming a disruption at least as long as the input window) and/or a combination of both actual and automated user inputs.

Specific Model Processing Examples

As noted, preprocessing 502 can be performed as a series of time steps. For instance, one convenient interval could be to use a standardized video frame rate and have one time step per video frame. At a video frame rate of 60 Hz, this gives 60 frames within a given one-second window. Each input window 504 can have 60 respective sets of actual or automated user inputs, and each output window 506 can have 60 respective sets of application output. As noted, the input window and output window can be time-aligned with each other.

Generally, actual or automated user inputs and application outputs can be preprocessed to obtain features for input to the fully-connected neural network 508 and the convolutional neural network 510, respectively. Thus, in some cases, preprocessing 502 can involve extracting features that can be useful for discriminating over the input window 504 and output window 506 to accurately predict the user input for the next time step. For instance, the preprocessing can include extracting a uniqueness feature from the actual or predicted user input for the current time step, where the uniqueness feature indicates whether that user input has changed from the user input in the previous time step.

Some user inputs, such as those provided by a video game controller, can be represented as a vector. For instance, specific entries in the vector can represent different button states as Boolean on/off values, and other entries in the vector can represent magnitudes for analog input mechanisms, e.g., trigger states and directional pressure applied to a thumb stick. The vector can also include entries indicating whether any values have changed since the previous time state. This vector representation can be used for both actual user inputs and predicted user inputs.

In implementations where the user inputs and application outputs are discretized and time-aligned to a 60 Hz video frame rate using one-second windows, each individual network in the neural network-based prediction model 500 can process 60 stacked input/output vectors concurrently, each vector representing 16.67 milliseconds of time. The recurrent neural network 512 can also maintain internal recurrent state that can be used to represent previous output of the recurrent network, and this internal recurrent state can include information that is not present in the current input/output windows. Thus, the recurrent neural network 512 can effectively model sequences of input/output data that are longer than the duration of the respective time windows provided by the preprocessing 502.

Also, note that some implementations can smooth or otherwise combine the automated user inputs 412 with previous actual or predicted user inputs to reduce jitter and/or user perception that the game is not responsive to their inputs. Also, note that neural network-based prediction model 500 can predict either final user input values or a delta relative to the last-seen user input.

Model Training and Architecture

The following discussion provides details on how a model, such as neural network-based prediction model 500, can be trained to generate automated user input. The following training approaches can be applied to various other types of machine learning model types, including other neural network structures as well as model types other than neural networks.

One way to train a model involves using imitation learning techniques. For instance, the DAgger algorithm is provided in S. Ross, G. J. Gordon, and J. Bagnell, "A Reduction of Imitation Learning and Structured Prediction to No-Regret Online Learning," in AISTATS, 2011. DAgger presents an iterative approach for learning a policy to imitate a user, where the policy specifies predicted user actions (e.g., user inputs) as a function of previously received information. As another example, the AggreVaTe algorithm is provided in S. Ross and J. Bagnell, "Reinforcement and Imitation Learning via Interactive No-Regret Learning," in arXiv:1406.5979, 2014. AggreVaTe is an extension of DAgger that uses a "cost-to-go" loss function to inform training rather than a binary zero or one classification loss.

In some implementations, separate models can be trained for each user and/or for each application. While this approach can ultimately provide high-quality models that can accurately predict user input, generating new models from scratch for each user and for each application can be time-consuming. In addition, this approach generally involves significant use of computing resources, such as storage resources for storing separate models and processor time to train separate models for each user. Furthermore, this approach relies on obtaining a significant amount of training data for each user and/or each application. As a consequence, users may not receive the benefit of an accurate prediction model until after they have interacted extensively with an application. In other words, models developed using this approach do not "come up to speed" quickly for new users.

Another high-level approach involves training a model for multiple users and then adapting part or all of that model to a particular user. To do so, several different techniques can be employed. One approach involves pretraining a model for many different users and then adapting that entire model for new users, e.g., by tuning the pretrained model using separate training epochs for new users. In this approach, each user ultimately ends up with their own full, user-specific model, but user data for other users is used to speed up training of the model. Alternatively, the model itself can have certain generic components, such as one or more neural network layers trained for multiple users, and one or more user-specific components, such as separate layer or layers that are trained specifically for each user.

Meta-learning approaches can also be employed, e.g., by starting with a set of weights learned from a large group of users and then customizing those weights to new users. Background information on meta-learning approaches can be found at the following: Munkhdalai et al., "Rapid Adaptation with Conditionally Shifted Neurons," in Proceedings of the 35th International Conference on Machine Learning, pp. 1-12, 2018, Munkhdalai et al., "Meta Networks," in Proceeding of the $34^{th}$ International Conference on Machine Learning, pp. 1-23, 2017, Koch et al., "Siamese Neural Networks for One-shot Image Recognition," in Proceedings of the $32^{nd}$ International Conference on Machine Learning, Volume 37, pp. 1-8, 2015, Santoro et al., "Meta-Learning with Memory-Augmented Neural Networks," in Proceedings of the $33^{rd}$ International Conference on Machine Learning, Volume 48, pp. 1-9, 2016, Vinyals et al., "Matching Networks for One Shot Learning," in Proceedings of the $30^{th}$ Conference on Neural Information Processing Systems, pp. 1-9, 2016, as well as Finn et al., "Model-Agnostic Meta-Learning for Fast Adaptation of Deep Networks," in Proceedings of the 34th International Conference on Machine Learning, pp. 1-13, 2017. These approaches can be helpful to allow the disclosed techniques to scale quickly for new users, thus reducing and/or potentially eliminating instances where the user is negatively affected by disruptions. In addition, these approaches can adapt quickly to changes in user skill and/or application difficulty, e.g., allowing a predictive model to adapt as a user becomes better at a video game and the video game becomes commensurately more difficult.

In further implementations, models can be trained using an auxiliary training task. For example, a model can be trained to predict which user generated a given input stream, or to predict the skill level of a given user from an input stream. A reward function can be defined over these objectives, where the model gets a reward for correctly identifying the user that generated the input stream or the skill level of the user. By training a model for such an auxiliary task using input data obtained from multiple users with different characteristics (e.g., skill levels), the model can learn how to discriminate between different users. Subsequently, when a new user begins gameplay, a model trained in this fashion may have the ability to infer that the new user is similar to one or more other users for which the model has already been trained.

Model training can use various sources of data. For instance, a given model can be trained off-line based on previous instances where a user or users interacted with that application. In other instances, a model can be trained online, as one or more users interact with the application. The actual user inputs received during a given application session can serve as labeled training data for the model. Thus, as a given interactive application executes and a user interacts with that application, the model can be generating predicted user inputs, comparing them to the actual user inputs, and propagating error back into the model to refine the model. In other words, the model can be trained to imitate the user while the user interacts with the application.

In some cases, after a disruption, actual user input may be received that was intended for the disruption period. For instance, packets having actual user inputs can be delivered late, e.g., after automated user input has been substituted for the actual user input. While the actual user input for the disruption period may be discarded for the purposes of controlling the application, the actual user input for the disruption period can nevertheless be used for training purposes.

In addition, individual portions of a given model can be trained offline and/or separate from the rest of the model. For instance, in some implementations, the convolutional neural network 510 of neural network-based prediction model 500 can be trained using video output, even in the absence of user inputs. For instance, the convolutional neural network can be trained using an auxiliary training task, as described above, or a reconstruction or masking task. The pretrained convolutional neural network can be inserted into the larger neural network structure along with the other layers, and the entire network structure can then be trained together using inputs and outputs obtained while one or more users interact with the application. This can allow the untrained components of the neural network to learn more quickly than training the convolutional neural network to learn from scratch together with the rest of the model.

The disclosed concepts can also be employed with a wide range of model architectures. Generally, the more context a model has, the more accurately the model can predict user input. Thus, for instance, using longer input/output windows can generally improve the accuracy of predictions. On the other hand, using longer input/output windows results in commensurately more input data for the model, which can increase training time and also introduce computational latency at runtime. Some implementations may employ alternative model structures for efficiency purposes to allow the model to have more context. For instance, a stack of dilated causal convolutional layers can be employed, as discussed at Oord et al., "WaveNet: A Generative Model of Raw Audio," arXiv:1609.03499 1-15, 2016 and/or a hierarchy of auto-regressive models can be employed, as discussed at Mehri et al., "SampleRNN: An Unconditional End-to-End Neural Audio General Model," in Proceedings of the 5th International Conference on Learning Representations, pp. 1-11, 2017.

Also, note that some implementations may employ input adjudication within a predictive model, rather than as separate functionality. For instance, a predictive model can learn when to substitute predicted user input for actual user input, e.g., using additional features describing network conditions (e.g., latency, bandwidth, packet drops, etc.). Likewise, a predictive model can learn to combine predicted user input with actual user input to reduce the impact of disruptions on a user. For instance, the predictive model can be trained using feedback that indicates perceived user disruption, and learn to smooth or otherwise combine actual and predicted user inputs in a manner that minimizes or otherwise mitigates perceived disruptions.

Input Adjudication

In some implementations, one or more triggering criteria can be used to determine when to employ automated user input. For instance, referring back to FIG. 4, one or more triggering criteria can be used to determine whether the input adjudicator 416 selects the actual user inputs 406 or the automated user inputs 412. For instance, one approach is to define a threshold period of time, e.g., 100 milliseconds, and to select the automated user input whenever no actual user inputs are received for the threshold amount of time.

Considering a networked scenario as shown in FIG. 1, network disruptions can prevent actual user input from being received by application server 102. Network disruptions be caused by various underlying circumstances, such as packets that are received too late, packets that are received out-of-order, and/or packets that are dropped on the network and thus not received at all. One way to address network disruptions is to substitute the automated user input when no packets are received by the intermediary server 104 from the client device for the threshold time. In some cases, the client can send a heartbeat signal at a regular interval (e.g., 10 milliseconds) to allow the intermediary server to distinguish network disruptions from scenarios where the user is simply not manipulating controller 108.

In further implementations, the threshold period can be adjusted for different users and/or different applications. For instance, user sensitivity to disruptions may vary based on user skill or by the type of application. Considering video games specifically, expert users may tend to notice shorter disruptions than novice users, or players of one video game may tend to notice relatedly short disruptions (e.g., 50 milliseconds) that are not noticed by players of another video game.

In other implementations, the threshold can be tied to the video frame rate, e.g., a threshold could be defined as three frames, or approximately 50 milliseconds at a 60 Hz frame rate. Still further implementations can learn the threshold as part of the user interaction model for different applications and/or different users.

Furthermore, note that the term "network disruption" can encompass scenarios where traffic is not completely impeded. For instance, network "jitter," or the variance in time delay of data packets, can significantly impact a user's experience with an interactive application. In some cases, automated user input can be employed when jitter exceeds a predetermined threshold, e.g., 50 milliseconds. Jitter can be detected using timestamps associated with actual user inputs.

Note that network disruptions can be bidirectional—they impact both flow of actual user input to an application as well as the flow of application output to a user device. In other cases, however, network disruptions only affect the flow of traffic in a particular direction. For instance, a network disruption might prevent actual user input from being received without impacting the flow of application output to the user. Conversely, a network disruption might prevent application output from reaching the user without impacting the flow of actual user inputs to the application.

Automated user input can be used to address any type of network disruption. For instance, consider a scenario where actual user inputs are not impacted by a network disruption, but the network disruption prevents application output from reaching the user for a threshold amount of time. Even though actual user input is available for this type of network disruption, in some scenarios it can still be worthwhile to substitute automated user input for the actual user input received during the disruption. Because the user does not receive the application output during the disruption, the user does not have an opportunity to adjust their inputs to changing application outputs. In this case, automated user inputs may more accurately reflect what the user would have provided had the disruption not prevented the application output from reaching the user.

In some implementations, the input adjudicator 416 can also take corrective actions after a disruption ends. For instance, assume that the input adjudicator has substituted automated user inputs for several previous actual user inputs, and those actual user inputs subsequently arrive late—after the disruption ends. Further assume that the automated user inputs steered the car more sharply than indicated by the late actual user inputs. In some implementations, this can be corrected by adjusting subsequently-received actual user inputs to steer the car less sharply for some time after the disruption, to compensate for the difference between the automated user inputs and the late actual user inputs. By doing so, the position of the car can more closely track where the car would have been in the absence of a disruption.

Alternative Implementations

The present concepts have been explained above largely using examples directed to a specific type of interactive application, e.g., a, streaming video game, a specific type of disruption, e.g., a network disruption, and a specific type of automated user input, e.g., predicted controller inputs generated using a machine learning model. However, the present concepts can be employed for many different interactive application types to address many different disruption types using many different types of automated user input, as discussed more below.

Taking application types first, a video game is but one example of an interactive application. Other examples include virtual or augmented reality applications, educational or training applications, etc. For instance, consider a multi-user driving simulator where users learn how to drive vehicles. As with video games, during a disruption to a driving simulator, it may be preferable to predict actual user behavior rather than optimal user behavior. This can provide a more realistic experience, e.g., where two drivers can both make mistakes that lead to a simulated accident. If a disruption were to occur and a model were used to generate optimal input rather than a model that predicts realistic user input, crashes might be avoided, giving the users a false sense of security and reducing the training value of the simulation.

As another example, consider an automated inventory control application that is constantly placing orders to replace merchandise. In some cases, a disruption could prevent the inventory control application from knowing about user orders for a prolonged period of time (e.g., overnight). Using predicted user orders to emulate how inventory changes during the disruption period can enable such an application to mitigate the effects of the disruption, e.g., by ensuring that sufficient parts are available in a factory to enable production to continue based on predicted, rather than actual, user orders.

As yet another example, consider a semi-autonomous robot, e.g., for disaster relief or medical applications. Generally, such a robot may be controlled by a remotely-located user. In some cases, such a robot may be operating in a remote location with spotty satellite reception, and utilize a local predictive model to take over for the remotely-located user when network disruptions occur. In some cases, this type of application may benefit from using a model trained for optimal behavior rather than emulating a specific user.

In addition, the disclosed implementations can be employed to address other types of disruptions besides network disruptions. For instance, some implementations may detect when a user is distracted from an interactive application, e.g., by detecting an incoming message or phone call, using a gyroscope or accelerometer on the client device, or simply lack of input to an input mechanism for a threshold amount of time. Any of these disruptions can be mitigated by providing automated user input to the interactive application during the disruption.

In addition, the disclosed implementations can be used to provide an enhanced experience for users that may have physical impairments. Consider a user who has a difficult time keeping a joystick or other input mechanism steady. Some implementations can treat tremors or other shaky movements as disruptions and smooth or otherwise combine the user's actual inputs with predicted user inputs to mitigate the impact of the user's impairments on their application experience.

As another example, consider internal disruptions on a particular device. For instance, consider a single physical server running a first virtual machine and a second virtual machine in different time slices. If the first virtual machine is running an interactive application, there may be user inputs received in a given time slice when the interactive application is not currently active on the processor. Previous techniques might have buffered actual user input in memory until a context switch from the second virtual machine to the first virtual machine. Using the disclosed techniques, the actual user input occurring during the time slice when the first virtual machine was inactive can be discarded, and automated user input can be generated and provided to the interactive application once the first virtual machine obtains the processor. Thus, memory can be saved because no buffer is needed to hold the actual user input during the time slice when the first virtual machine is inactive.

As another example, automated user input can be used for compression purposes. For instance, in the example shown in FIG. 1, the client device 106 could discard certain user inputs, e.g., skipping every other user input and not sending them to the intermediary server 104. The intermediary server can substitute automated user inputs for every other actual user input. This approach can save network bandwidth while still providing a satisfactory user experience.

As another compression example, instead of discarding actual user input entirely, some implementations can discard part of certain actual user inputs, e.g., sending a certain number (e.g., three) highest-order bits of actual user input to the intermediary server and letting the intermediary server fill in the remaining bits (e.g., 13 bits for a 16-bit input) with the user interaction model 408. Yet another compression example can employ another instance of the prediction model on the user device. The user device can calculate the difference between each actual user input and the corresponding predicted input and send the difference to the intermediary server, which can derive the actual user input from the difference since the same prediction model is running on the intermediary server. Because the difference between the predicted and actual user inputs will often be relatively small, it takes fewer bits to send this information over the network than the full actual user input. The aforementioned compression techniques can be viewed as mechanisms that intentionally introduce preprogrammed disruptions to reduce the amount of network traffic.

In some cases, preprogrammed disruptions can be used to conserve battery life, e.g., on a video game controller. For instance, the video game controller can sleep for a designated amount of time, e.g., 50 milliseconds, wake up, detect input, and send a new set of controls each time it wakes up. The intermediary server 104 can fill in any gaps during the sleep intervals using automated input.

As another example, automated user inputs can be used for preemptive scheduling or loading of application code. Suppose, for instance, that a given application module will be loaded into memory if a user performs a particular action, such as successfully accomplishing an objective in a video game or crashing a car in a driving simulation. Some implementations can predict whether the user's future inputs are likely to perform that action. If so, this can be used as a trigger for the interactive application to begin loading that module into memory or to schedule that module for execution prior to receiving the user's actual input. In this case, the automated user inputs are not necessarily used to control the application, but rather to selectively perform certain processing in advance, such as loading code or data from storage into memory or informing scheduling decisions by an operating system. In some cases, the user interaction model can maintain a future window of predicted user inputs, e.g., 500 milliseconds, and using the predicted user inputs in that window to selective load and/or schedule application code.

Furthermore, the disclosed implementations can be employed in scenarios other than client/server scenarios as described above. For instance, a peer-to-peer game could involve communication between two peer devices. When communication between the peer devices suffers, e.g., the devices are briefly out of range for a short-range wireless connection such as Bluetooth, automated user inputs can be employed to provide a satisfactory user experience. Thus, in this example, the triggering criteria for selecting automated rather than actual user inputs can relate to characteristics of the short-range wireless connection, such as signal strength or throughput. Also, note that this could result in both users perceiving predicted versions of each other during the time when the peer-to-peer game is disrupted. This approach can improve the experience for a user other than the user whose inputs are being predicted, e.g., if predicted user inputs for a first user are substituted during a disruption, then the disruption is mitigated from the perspective of a second user who views a representation of the first user in the peer-to-peer game.

The disclosed implementations can also be employed on a single device. For instance, a user interaction model can be provided on a gaming console or other device. An input adjudicator can be provided on the device to select whether the interactive application receives actual user input or automated user input. For instance, in some implementations, the input adjudicator can use criteria such as disk throughput, memory utilization, or processor utilization to recognize instances where the user inputs to the interactive application might be delayed and provide automated user input to the interactive application in those instances.

As also noted, while some implementations can use a machine-learned user interaction model, other implementations can utilize other types of user interaction model. For instance, in a driving game, the user interaction model can provide precomputed directional or throttle inputs for each location along the driving course, where the precomputed inputs are static and not user-specific. Those precomputed inputs can be substituted for actual user input during disruptions. As with using a predictive model, the user's previous inputs can be smoothed or otherwise combined at runtime with predetermined user inputs for a given location on the course.

In addition, some implementations can predict application output as well as user input. For instance, recall that network disruptions are not always bidirectional. Previously, it was noted that substitution of automated user inputs can be used to mitigate network disruptions that prevents the user from receiving application output. Alternatively, some implementations can predict application output and provide the predicted application output to the user during the disruption. In this circumstance, the actual user inputs can be used because the user provided those inputs in response to the predicted application output rather than in response to "frozen" application output during the disruption.

Example System

Figure 6:
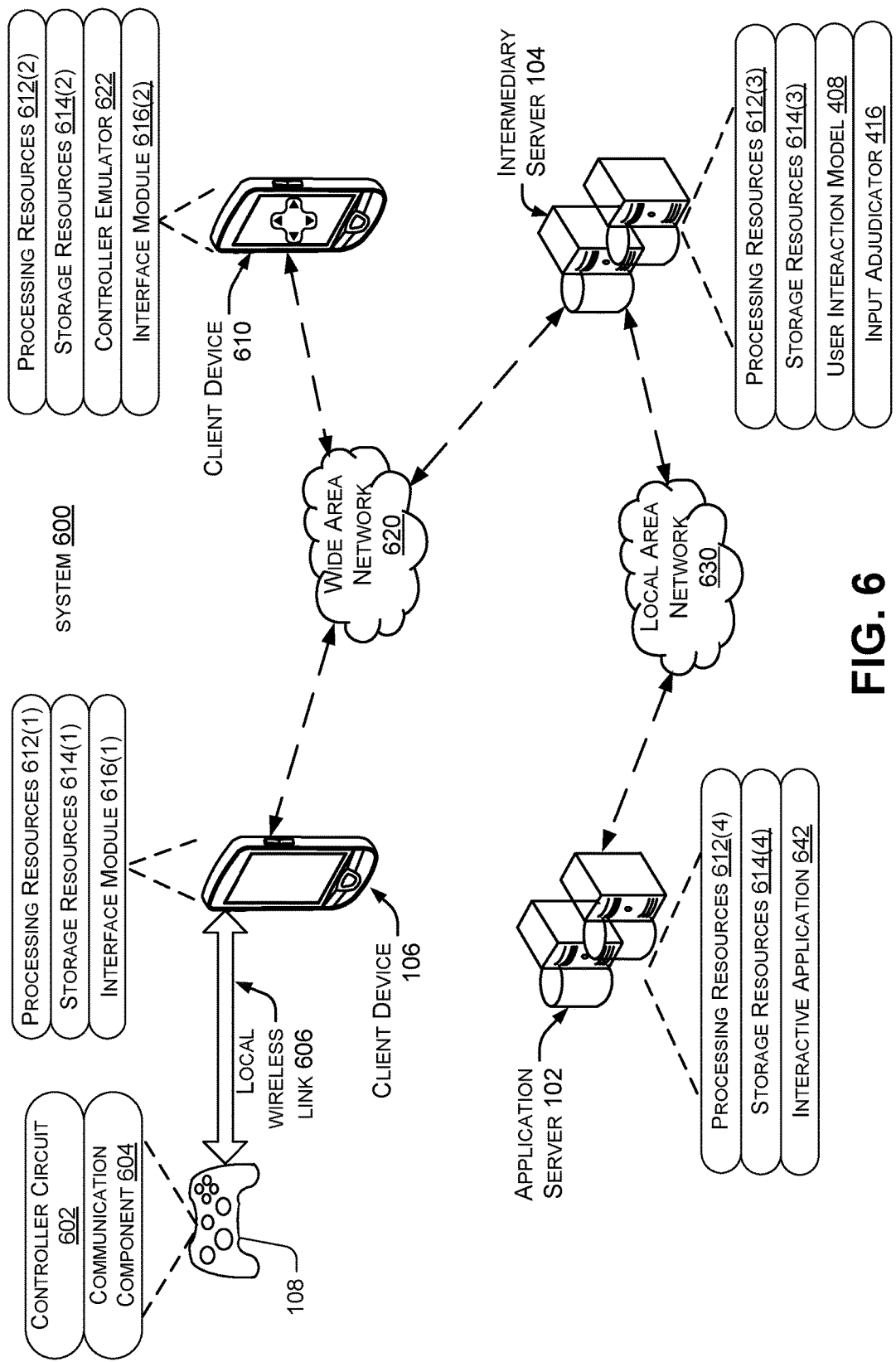
FIG. 6 illustrates an example system, consistent with some implementations of the present concepts.

The present concepts can be implemented in various technical environments and on various devices. FIG. 6 shows an example system 600 in which the present concepts can be employed, as discussed more below. As shown in FIG. 6, system 600 includes application server 102, intermediary server 104, client device 106, and video game controller 108, introduced above with respect to FIG. 1. System 600 also includes a client device 610. Client device 106 is connected to video game controller 108 via a local wireless link 606. Both client device 106 and client device 610 are connected to intermediary server 104 via a wide-area network 620. Intermediary server 104 is connected to application server 102 via a local-area network 630.

Certain components of client devices and servers shown in FIG. 6 may be referred to herein by parenthetical reference numbers. For the purposes of the following description, the parenthetical (1) indicates an occurrence of a given component on client device 106, (2) indicates an occurrence of a given component on client device 610, (3) indicates an occurrence on intermediary server 104, and (4) indicates an occurrence on application server 102. Unless identifying a specific instance of a given component, this document will refer generally to the components without the parenthetical.

Generally, the devices shown in FIG. 6 may have respective processing resources 612 and storage resources 614, which are discussed in more detail below. The devices may also have various modules that function using the processing and storage resources to perform the techniques discussed herein, as discussed more below.

Video game controller 108 can include a controller circuit 602 and a communication component 604. The controller circuit can digitize inputs received by various controller mechanisms such as buttons or analog input mechanisms. The communication component can communicate the digitized inputs to the client device 106 over the local wireless link 606. Interface module 616 on client device 106 can obtain the digitized inputs and send them over wide area network 620 to the intermediary server 104.

Client device 610 can provide a controller emulator 622. The controller emulator can display a virtual controller on a touch screen of the client device. Inputs received via the virtual controller can be sent over the wide area network to the intermediary server 104.

The intermediary server 104 can receive packets with actual controller inputs over wide area network 620 from either client device 106 or client device 610. The input adjudicator 416 on the intermediary server can determine whether to send those actual controller inputs to the application server 102 over local area network 630 or send automated user inputs generated via user interaction model 408. For instance, the input adjudicator can substitute the automated user inputs for actual user inputs during network disruptions, and cease the substitution when the network disruption is resolved by providing subsequently received actual user inputs to the application server.

Interactive application 642 can process the received actual or automated user inputs and generate corresponding application outputs. The interactive application can send the outputs over local area network 630 to intermediary server 104, which can use the outputs to generate further automated user inputs. In addition, the intermediary server can forward the outputs over wide area network 620 to client device 106 or client device 610.

Client device 106 and/or client device 610 can display video output and play back audio output. If the application outputs include haptic feedback, client device 106 can send haptic signals to video game controller 108 over local wireless link 606, and the video game controller can produce haptic output based on the received signals. If the outputs provided to client device 610 include haptic signals, the client device 610 can generate haptic outputs on the client device itself via controller emulator 622.

Example Method

Figure 7:
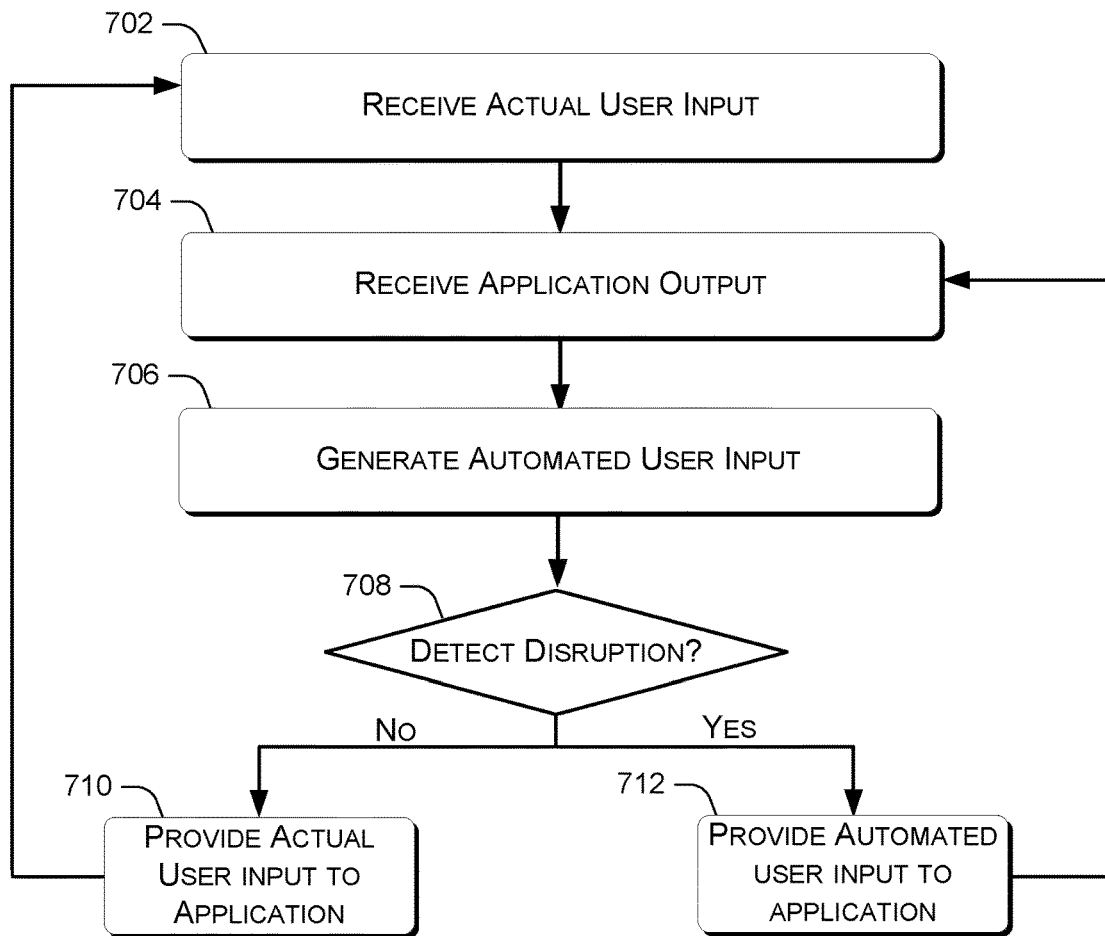
FIG. 7 illustrates an example method or technique, consistent with some implementations of the present concepts.

FIG. 7 illustrates an example method 700 that can be used to selectively provide actual or automated user input to an application, consistent with the present concepts. As discussed elsewhere herein, method 700 can be implemented on many different types of devices, e.g., by one or more cloud servers, by a client device such as a laptop, tablet, or smartphone, or by combinations of one or more servers, client devices, etc.

Method 700 begins at block 702, where actual user input is received. For instance, actual user input can be received via a client device, via a dedicated controller such as a video game or virtual reality controller, or by any other suitable mechanism for providing user input to the application.

Method 700 continues at block 704, where application output is received. As noted, the application output can include video, audio, and/or haptic feedback produced by an interactive application.

Method 700 continues at block 706, where automated user input is generated. For instance, automated user input may be generated by a user interaction model as a user interacts with an application. Alternatively, automated user input may be generated in advance of the user interaction, e.g., by precomputing the automated user input.

Method 700 continues at decision block 708, where a determination is made whether a disruption has occurred. As noted, disruptions can include network disruptions, incoming phone calls, periods of user inactivity, preprogrammed disruptions, etc.

If no disruption is detected at block 708, method 700 continues to block 710, where the actual user inputs are provided to the application. Method 700 continues back to block 702 and another iteration of the method can be performed.

If a disruption is detected at block 708, method 700 continues to block 712, where the automated user inputs are provided to the application. Method 700 continues back to block 704, where additional application output is received. Method 700 continues to block 706 where additional automated user input is generated, e.g., using actual user input received prior to the disruption, application output received prior to or during the disruption, and/or automated user input generated prior to or during the disruption. Method 700 can iterate through blocks 704, 706, 708, and 712 until the disruption ends.

Note that, in some implementations, block 706 can be performed by a user interaction model executing in the background during normal operation of an interactive application. In other implementations, the user interaction model can be inactive during normal operation, and invoked during disruptions.

Also, recall that some disruptions may impact both actual user input as well as application output, whereas other disruptions only impact application output or actual user input, but not both. The description of method 700 above corresponds to disruptions that impact actual user input, but not application output. As previously noted, however, automated user input can be provided to an application during other types of disruptions as well.

Device Implementations

As noted above with respect to FIG. 6, system 600 includes several devices, including client device 106, client device 610, intermediary server 104, and application server 102. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage resources. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. In some cases, the modules of system 600 are provided as executable instructions that are stored on persistent storage devices, loaded into the random-access memory devices, and read from the random-access memory by the processing resources for execution.

As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 620 and/or 630.

In addition, some implementations may employ any of the disclosed techniques in an Internet of Things (IoT) context. In such implementations, a home appliance or automobile might provide computational resources that implement the modules of system 600. As also mentioned, some implementations may be used for virtual or augmented reality applications, by performing some or all of the disclosed functionality on a head-mounted display, handheld virtual reality controller, or using techniques such as depth sensors to obtain user input via physical gestures performed by the users.

Various device examples are described above. Additional examples are described below. One example includes a method performed by a computing device, the method comprising generating automated user inputs for an interactive application, detecting a disruption to the interactive application during interaction by a user with the interactive application, and responsive to detecting the disruption, providing the automated user inputs to the interactive application.

Another example can include any of the above and/or below examples where the method further comprises generating a user interaction model of user interactions with the interactive application and generating the automated user inputs with the user interaction model.

Another example can include any of the above and/or below examples where the user interaction model can be a user-specific model for the user.

Another example can include any of the above and/or below examples where the user interaction model can be an application-specific model for the interactive application.

Another example can include any of the above and/or below examples where the method further comprises obtaining actual user inputs prior to the disruption, obtaining outputs of the interactive application prior to the disruption, and inputting the actual user inputs and the outputs to the user interaction model.

Another example can include any of the above and/or below examples where the user interaction model comprises a machine learning model.

Another example can include any of the above and/or below examples where the method further comprises training the machine learning model using discarded actual user inputs provided by the user during the disruption and received after the disruption ends.

Another example can include any of the above and/or below examples where the method is performed without providing internal application state of the interactive application to the user interaction model.

Another example can include any of the above and/or below examples where the interactive application comprises an online application.

Another example can include any of the above and/or below examples where the disruption comprises a network disruption.

Another example can include any of the above and/or below examples where the method further comprises detecting the network disruption when packets having actual user inputs are not received for a threshold period of time.

Another example can include any of the above and/or below examples where the online application comprises a streaming video game.

Another example can include any of the above and/or below examples where the automated user inputs comprises predicted controller inputs for a video game controller.

Another example can include any of the above and/or below examples where the predicted controller inputs substitute for actual user input provided by an analog input mechanism on the video game controller.

Another example includes a system comprising a hardware processing unit and a storage resource storing computer-readable instructions which, when executed by the hardware processing unit, cause the hardware processing unit to: detect a network disruption that impacts receipt of one or more actual user inputs by a streaming interactive application, using previously received actual user inputs to the streaming interactive application, generate automated user inputs, and responsive to detecting the network disruption, substitute the automated user inputs for the one or more actual user inputs to the streaming interactive application.

Another example can include any of the above and/or below examples where the computer-readable instructions, when executed by the hardware processing unit, cause the hardware processing unit to in the absence of the network disruption, forward received actual user inputs to a computing device executing the streaming interactive application and during the network disruption, forward the automated user inputs to the computing device executing the streaming interactive application.

Another example can include any of the above and/or below examples where the computer-readable instructions, when executed by the hardware processing unit, cause the hardware processing unit to use outputs of the streaming interactive application to generate the automated user inputs.

Another example can include any of the above and/or below examples where the computer-readable instructions, when executed by the hardware processing unit, cause the hardware processing unit to detect that the network disruption has been resolved and further actual user inputs have been received and responsive to detecting that the network disruption has been resolved, cease substitution of the automated user inputs for the further actual user inputs.

Another example includes a computer-readable storage medium storing computer-readable instructions which, when executed by a hardware processing unit, cause the hardware processing unit to perform acts comprising: receiving video output of an interactive application, receiving actual user inputs to the interactive application provided by a user, detecting a disruption that impacts receipt of further actual user inputs by the interactive application, providing the video output of the interactive application and the actual user inputs to a prediction model, obtaining predicted user inputs from the prediction model, and providing the predicted user inputs to the interactive application during the disruption.

Another example can include any of the above and/or below examples where the acts further comprise detecting that the disruption has ceased and responsive to detecting that the disruption has ceased, providing subsequently received actual user inputs to the interactive application.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed by a computing device, the method comprising:
   obtaining at least one of actual user input to an interactive application or output by the interactive application;
   inputting the actual user input or the output to a particular user interaction model, the particular user interaction model having been tuned to a particular user by using particular training data for the particular user to modify a pretrained user interaction model that has been pretrained for multiple users;
   generating automated user inputs for the interactive application using the particular user interaction model; and
   in at least one instance, providing the automated user inputs to the interactive application in place of further actual input from the particular user.

2. The method of claim 1, further comprising:
   obtaining the pretrained user interaction model after the pretrained user interaction model has been trained for one or more first training epochs using training data for the multiple users; and
   using the particular training data for the particular user, performing one or more second training epochs on the pretrained user interaction model to tune the pretrained user interaction model to the particular user and thereby obtain the particular user interaction model.

3. The method of claim 2, wherein the pretrained user interaction model comprises a pretrained neural network, and the particular user interaction model comprises a particular version of the pretrained neural network that is tuned for the particular user.

4. The method of claim 3, wherein the pretrained neural network comprises a pretrained set of weights obtained using the training data for the multiple users.

5. The method of claim 4, wherein the particular user interaction model comprises a customized set of weights tuned for the particular user, the customized set of weights being obtained by modifying the pretrained set of weights using the particular training data for the particular user.

6. The method of claim 1, wherein the particular user interaction model comprises one or more user-specific components trained for the particular user.

7. The method of claim 6, wherein the particular user interaction model comprises one or more generic components trained for the multiple users.

8. The method of claim 7, wherein the particular user interaction model comprises a neural network, the one or more user-specific components comprise one or more layers of the neural network, and the one or more generic components comprise one or more other layers of the neural network.

9. A system comprising:
   a hardware processing unit; and
   a storage resource storing computer-readable instructions which, when executed by the hardware processing unit, cause the hardware processing unit to:
   using previously received actual user inputs provided by a particular user to an application, generate automated user inputs for the application using a particular user interaction model that has been adapted tuned to the particular user; and
   in one or more instances, substitute the automated user inputs for one or more actual user inputs to the application,
   wherein the particular user interaction model has been tuned for the particular user from a pretrained user interaction model that, prior to being tuned, was pretrained using training data for multiple users.

10. The system of claim 9, wherein the particular user interaction model has at least one user-specific component trained for the particular user and at least one generic component trained for the multiple users.

11. The system of claim 9, wherein the particular user interaction model has customized weights tuned for the particular user from a pretrained set of weights obtained using training data for the multiple users.

12. The system of claim 9, wherein the computer-readable instructions, when executed by the hardware processing unit, cause the hardware processing unit to:
   obtain video, audio, or haptic output from the application; and
   input the previously received actual user inputs and the video, audio, or haptic output to the particular user interaction model to obtain the automated user inputs.

13. The system of claim 9, wherein the computer-readable instructions, when executed by the hardware processing unit, cause the hardware processing unit to:
   determine when to substitute the automated user inputs for the one or more actual user inputs using a predictive adjudication model.

14. The system of claim 13, the predictive adjudication model having been trained to recognize network disruptions, the one or more instances comprising instances when the predictive adjudication model recognized individual network disruptions.

15. The system of claim 14, wherein the computer-readable instructions, when executed by the hardware processing unit, cause the hardware processing unit to:
   input one or more features describing network conditions to the predictive adjudication model, the one or more features representing at least one of latency, bandwidth, or packet drops.

16. A computer-readable storage medium storing computer-readable instructions which, when executed by a hardware processing unit, cause the hardware processing unit to perform acts comprising:
   receiving video output of an interactive application;
   receiving actual user inputs to the interactive application provided by a particular user;
   detecting a disruption that impacts receipt of further actual user inputs by the interactive application;
   providing the video output of the interactive application and the actual user inputs to a particular user interaction model, the particular user interaction model having been pretrained using training data for multiple users and tuned for the particular user using particular training data for the particular user;
   obtaining predicted user inputs from the particular user interaction model; and
   providing the predicted user inputs to the interactive application during the disruption.

17. The method of claim 1, wherein the pretrained user interaction model and the particular user interaction model comprise a convolutional layer, the convolutional layer having been pretrained using training data for the multiple users to obtain the pretrained user interaction model and tuned using the particular training data for the particular user to obtain the particular user interaction model.

18. The method of claim 1, wherein the pretrained user interaction model and the particular user interaction model comprise a fully-connected layer, the fully-connected layer having been pretrained using training data for the multiple users to obtain the pretrained user interaction model and tuned using the particular training data for the particular user to obtain the particular user interaction model.

19. The method of claim 1, wherein the pretrained user interaction model and the particular user interaction model comprise a recurrent layer, the recurrent layer having been pretrained using training data for the multiple users to obtain the pretrained user interaction model and tuned using the particular training data for the particular user to obtain the particular user interaction model.

20. The system of claim 9, wherein the particular user interaction model comprises a recurrent neural network having customized weights tuned for the particular user, the customized weights being obtained by modifying a pretrained set of weights obtained using training data for the multiple users.

* * * * *